US008146883B2

(12) United States Patent
O'Hara

(10) Patent No.: US 8,146,883 B2
(45) Date of Patent: Apr. 3, 2012

(54) APPARATUS TO CONNECT A VALVE STEM TO A VALVE MEMBER

(75) Inventor: Dennis Eugene O'Hara, Strafford, NH (US)

(73) Assignee: Fisher Controls International LLC, Marshalltown, IA (US)

( * ) Notice: Subject to any disclaimer, the term of this patent is extended or adjusted under 35 U.S.C. 154(b) by 1212 days.

(21) Appl. No.: 11/844,167

(22) Filed: Aug. 23, 2007

(65) Prior Publication Data

US 2009/0049671 A1 Feb. 26, 2009

(51) Int. Cl.
*F16K 31/44* (2006.01)
(52) U.S. Cl. ............................ 251/77; 251/293; 251/291
(58) Field of Classification Search .................. 251/77, 251/291, 293, 214, 330; 403/310
See application file for complete search history.

(56) References Cited

U.S. PATENT DOCUMENTS

| | | | | |
|---|---|---|---|---|
| 958,716 | A | * | 5/1910 | Bard ............................... 251/77 |
| 1,000,799 | A | * | 8/1911 | Grimes ......................... 251/330 |
| 2,108,234 | A | * | 2/1938 | Gwynne ........................ 251/318 |
| 3,265,351 | A | | 8/1966 | Bredtschneider |
| 4,074,542 | A | * | 2/1978 | Hankosky et al. .............. 251/77 |
| 4,361,167 | A | * | 11/1982 | Harasewych ................... 251/77 |
| 4,682,757 | A | * | 7/1987 | Shelton ............................ 251/77 |
| 4,815,698 | A | | 3/1989 | Palmer |
| 5,201,335 | A | | 4/1993 | Osgood et al. |
| 5,261,449 | A | * | 11/1993 | Smetters ........................ 403/310 |
| 6,371,442 | B1 | * | 4/2002 | Hara et al. ....................... 251/80 |

FOREIGN PATENT DOCUMENTS

GB 2304175 12/1997

OTHER PUBLICATIONS

International Searching Authority, International Search Report for International Application No. PCT/US2008/073001, Mar. 12, 2008, 4 pages.
International Searching Authority, Written Opinion for International Application No. PCT/US2008/073001, Mar. 12, 2008, 6 pages.
U.S. Appl. No. 11/711,428, filed Feb. 27, 2007, Inventor Leslie E. Fleming.
U.S. Appl. No. 11/880,529, filed Jul. 23, 2007, Inventor William E. Wears.
State Intellectual Property Office of P.R. China, The Notification of the First Office Action, for corresponding application No. 200880103848.X, issued on Mar. 2, 2011, 9 pages.
International Preliminary Report on Patentability, Issued in connection with PCT/US2008/073001, Feb. 24, 2010, 6 pages.

* cited by examiner

*Primary Examiner* — John Fristoe, Jr.
*Assistant Examiner* — Andrew J Rost
(74) *Attorney, Agent, or Firm* — Hanley, Flight & Zimmerman, LLC.

(57) ABSTRACT

Apparatus to connect a valve stem to a valve member are disclosed. An example apparatus includes a valve stem having a laterally extending opening, a valve member having a laterally extending opening, and a coupling having adjacent one end an extension received in the laterally extending opening of the valve stem and adjacent an opposite end an extension received in the laterally extending opening of the valve member. A resilient member is located between the valve stem and the valve member.

27 Claims, 6 Drawing Sheets

APPARATUS TO CONNECT A VALVE STEM TO A VALVE MEMBER

FIELD OF THE DISCLOSURE

This disclosure relates generally to apparatus to connect a valve stem to a valve member and, more particularly, to apparatus to connect a metal valve stem to a non-metallic valve member.

BACKGROUND

Processing plants use control valves in a wide variety of applications such as, for example, controlling product flow in a food processing plant, maintaining fluid levels in large tank farms, etc. Automated control valves are used to manage the product flow or to maintain the fluid levels by functioning like a variable passage. The amount of fluid flowing through a valve body of the automated control valve can be accurately controlled by precise movement of a valve member (e.g., a plug). In some control valves, the control valve (e.g., a sliding valve stem valve) may include a metal valve stem connected via threads to a threaded opening of a metal valve member so that the metal valve stem is oriented substantially perpendicular to the metal valve member. The metal valve stem may be fixed to the metal valve member by welding together the metal valve stem and the metal valve member. However, the valve stem and valve member cannot be welded together if either the valve stem or the valve member are made of a non-weldable material, or if the filler material is incompatible with the base material of the valve stem or the valve plug. For example, the valve stem may be made of a weldable material such as, for example, 316 strain-hardened stainless steel and the valve member may be made of a non-weldable cast material such as, for example, Monel®. Alternatively, the valve stem may be secured to the valve member by using a drive pin. However, connecting the valve stem to the valve member by using a drive pin can cause misalignment between the valve stem and the valve member and affect the integrity of the valve member.

The combination of a metal valve stem and a metal or non-metallic valve member such as, for example, a ceramic valve member, may be utilized for certain processes. During the operation of the control valve, tensile forces will be exerted by the threads of the metal valve stem on the threads of the ceramic valve member. The engagement of the threads of the metal valve stem with the threads of the ceramic valve member can result in damage to the ceramic valve member.

SUMMARY

An apparatus to connect a valve stem to a valve member includes a valve stem having a laterally extending opening and a valve member having a laterally extending opening. A coupling has adjacent one end an extension received in the laterally extending opening of the valve stem and adjacent an opposite end an extension received in the laterally extending opening of the valve member. A resilient member is located between the valve stem and the valve member.

DETAILED DESCRIPTION

In general, the example apparatus to connect a valve stem to a valve member described herein may be utilized for connections between parts in various types of assemblies or devices. Additionally, while the examples disclosed herein are described in connection with the control of product flow for the processing industry, the examples described herein may be more generally applicable to a variety of control operations for different purposes.

Figure 1:
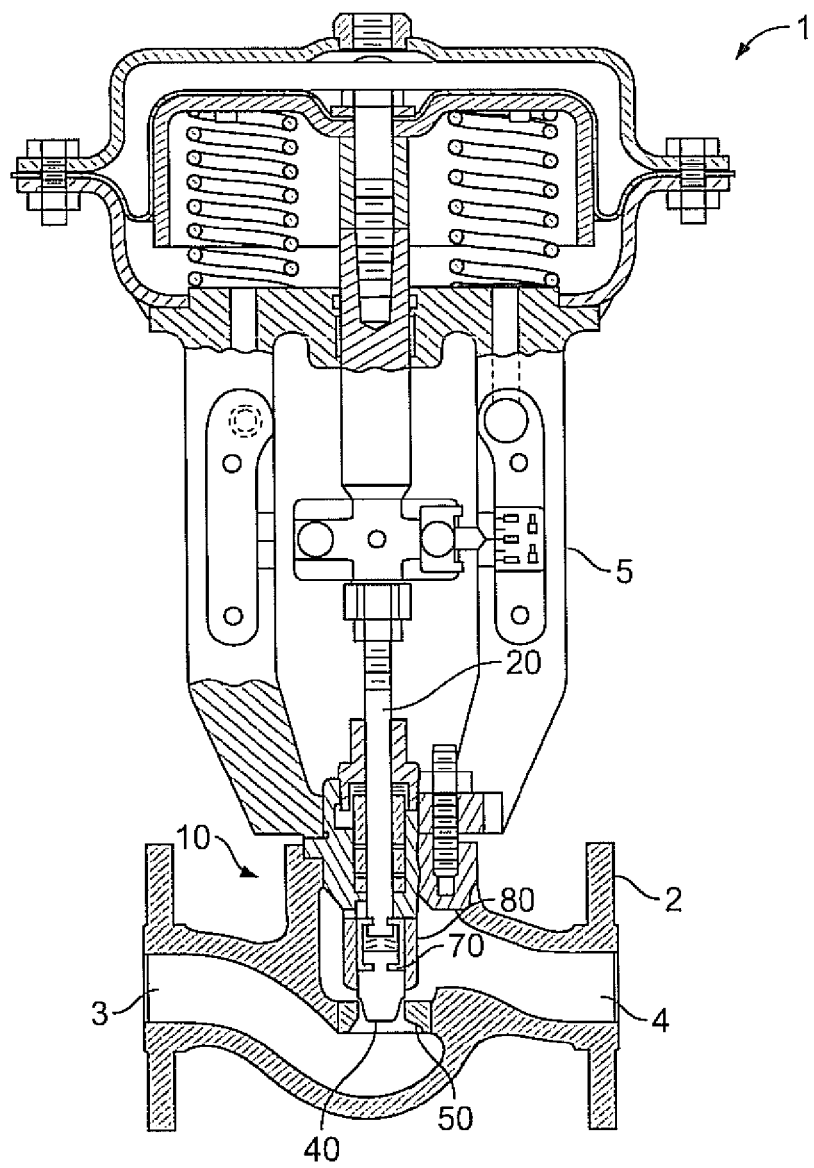
FIG. 1 is a cut-away illustration of a control valve having an example apparatus to connect a valve stem to a valve member.

FIG. 1 is a cut-away illustration of a control valve 1 having an example apparatus 10 to connect a valve stem 20 to a valve member 40. The control valve 1 includes a body 2 having an inlet 3 communicating fluid to an outlet 4 via a valve seat 50 and the valve member 40. An actuator 5 is connected to the body 2 and can operate to displace the valve stem 20. A split coupling 70 (see FIG. 1a) is located within a housing or bonnet post 80 and couples the valve stem 20 to the valve member 40. The actuator 5 can displace the valve stem 20 and the valve member 40 to control fluid flow through the valve seat 50. Although the control valve 1 is illustrated as a globe type of control valve, control valve 1 may be any of numerous types of control valves that include a valve stem connected to a valve member.

Figure 2:
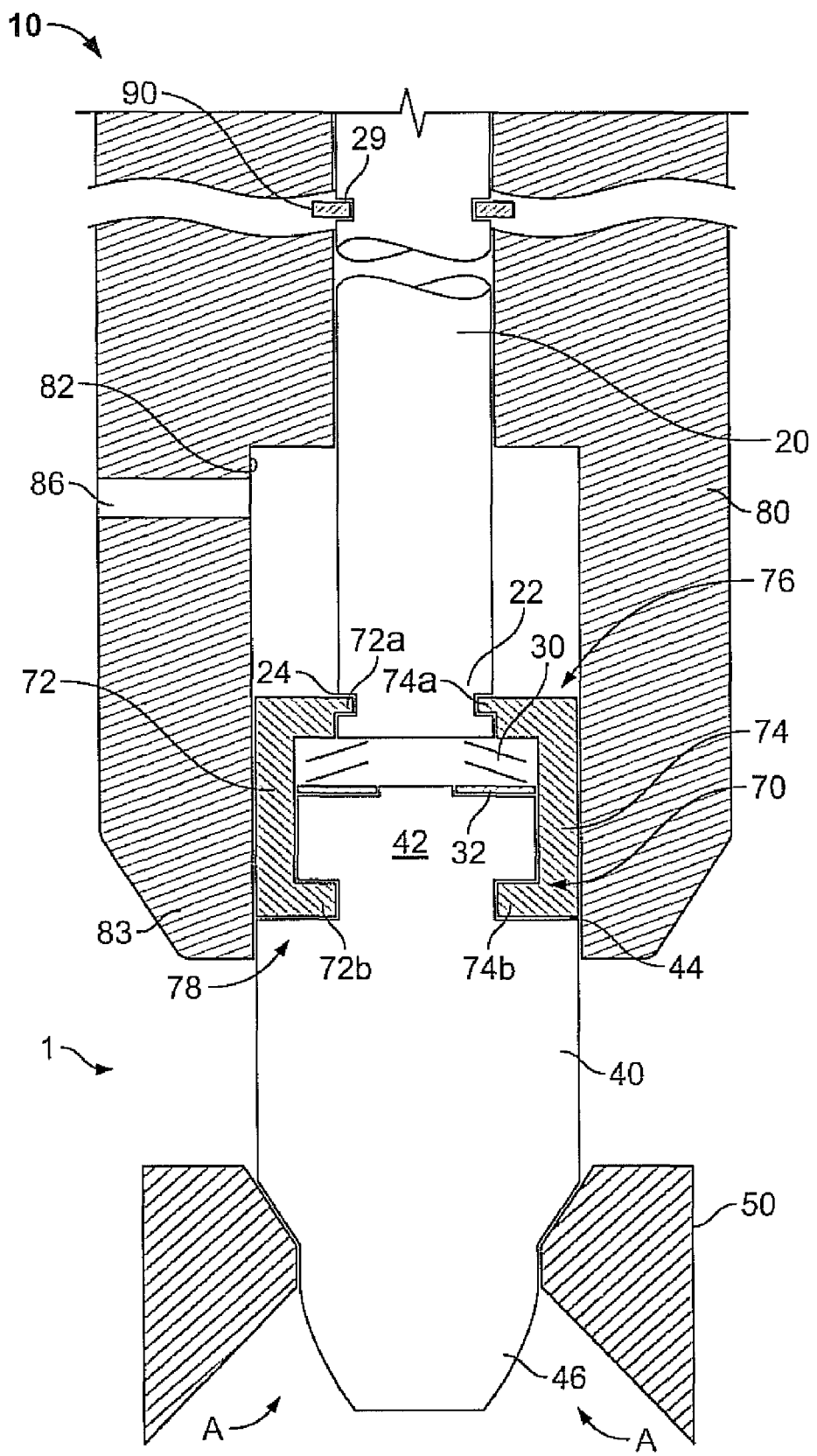
FIG. 2 is an enlarged partially cut-away schematic illustration of the example apparatus to connect a valve stem to a valve member in FIG. 1.

FIG. 2 is an enlarged partially cut-away schematic illustration of the example apparatus 10 to connect the valve stem 20 to the valve member 40 in the control valve 1 of FIG. 1, and illustrates the valve member 40 in engagement with the valve seat 50. The valve stem 20 is made of a metal such as, for example, 316 strain-hardened stainless steel and includes a lateral or radially extending opening 24 located at an end 22 of the valve stem 20. The valve member 40 is made of a metallic or non-metallic material such as, for example, a ceramic. The valve member 40 includes a lateral or radially extending opening 44 located at an end 42 of the valve member 40. At an opposite end 46, the valve member 40 is received in the valve seat 50 of the control valve. As is clearly shown in FIG. 2, the reception of the end 46 of the valve member 40 in the valve seat 50 prevents fluid from flowing in the direction of the arrows A in the control valve 1.

A resilient member or Belleville spring 30 and a washer 32 are located between the valve stem 20 and the valve member 40. The resilient member 30 engages the end 22 of the valve stem 20 and the washer 32 engages the end 42 of the valve member 40.

Figure 1A:
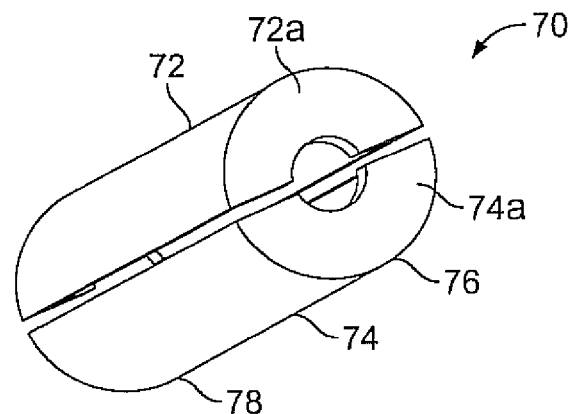
FIG. 1a is an enlarged schematic illustration of a split coupling of the example apparatus of FIG. 1.

Referring to FIGS. 1, 1a and 2, the split coupling 70 is generally cylindrically-shaped and includes two opposing portions or members 72 and 74 having opposing extensions 72a and 74a, respectively, at an end 76 of the coupling 70, and opposing extensions 72b and 74b at an opposite end 78 of the coupling 70 (see FIG. 2). The housing or bonnet post 80 of the control valve 1 includes a bore 82 within which the valve stem 20, the valve member 40, the resilient member 30, the washer 32, and the coupling 70 are located for reciprocating movement. As can be clearly seen in FIG. 2, when the valve member 40 is seated in the valve seat 50, the valve stem 20, the coupling 70 and the end 42 of the valve member 40 do not extend beyond a lower end 83 of the housing 80. Depending on the tolerances and/or clearances between the coupling 70, the housing 80, the valve member 40, and the valve stem 20, a vent 86 may be provided in the housing 80 to prevent fluid build-up in the bore 82.

To assemble the example apparatus 10 of the control valve 1, the resilient member 30 and the washer 32 are placed between the valve stem 20 and the valve member 40. The valve stem 20 and the valve member 40 are moved toward one another (i.e., the resilient member 30 is compressed), and then the two members 72 and 74 of the coupling 70 are each positioned about and moved toward the end 22 of the valve stem 20 and the end 42 the valve member 40 so that the extensions 72a and 74a are received in the laterally extending opening 24 and the extensions 72b and 74b are received in the laterally extending opening 44. The valve stem 20, the resilient member 30, the washer 32, the coupling 70, and the valve member 40 are then disposed or placed within the bore 82 of the housing 80. The housing 80 retains or captures the two portions or members 72 and 74 of the coupling 70 within the bore 82 such that extensions 72a, 74a, 72b and 74b remain in the respective laterally extending openings 24 and 44. To ensure that the valve stem 20 remains within the bore 82 so that the valve member 40 remains coupled to the valve stem 20, the valve stem 20 may include a retainer, such as for example, a snap ring 90 in a groove 29 at an upper portion of the valve stem 20. Thus, once the apparatus 10 is assembled, the housing 80, the valve stem 20, the resilient member 30, the washer 32, the coupling 70, and the valve member 40 may be inserted into or removed from the control valve 1 without the valve stem 20 and the control valve member 40 slipping out of the bore 82 of the housing 80.

In the illustrated example apparatus 10 of FIGS. 1, 1a and 2, the resilient member 30 forces the valve stem 20 and the valve member 40 away from one another and into engagement with the coupling 70 to take-up or remove play or looseness resulting from a stack-up of dimensional tolerances of the valve stem 20, the valve member 40, and the coupling 70. However, the coupling 70 and the resilient member 30 enable the valve member 40 to move toward the valve stem 20 and compress the resilient member 30. When the valve stem 20 is moved downwardly toward the valve member 40, the example apparatus 10 transfers the downward force and movement of the valve stem 20 to the valve member 40 to engage the valve member 40 with the valve seat 50. Additionally, upward movement of the valve stem 20 moves the valve member 40 away from the valve seat 50. The transfer of the shut-off load of the valve stem 20 to the valve member 40 via the coupling 70 can achieve a distribution of the shut-off load over a larger surface area of the valve member 40. Also, the resilience or flexibility of the resilient member 30 enables the valve member 40 to self-adjust during engagement with the valve seat 50, thereby enabling the valve member 40 to align or seat for a better shut-off of fluid flow at the valve seat 50.

The apparatus 10 enables the operation of the control valve 1 in environments that are detrimental to metal valve members. The ceramic valve member 40 enables the control valve to operate in environments having high vibration, high temperature, high pressure, high velocity media, mixed media, multiphase flow, and/or severe service conditions. Additionally, a lower end 83 of the housing 80 provides, in the absence of the vent 86, a fluid barrier to prevent fluid from entering the bore 80 and affecting the valve stem 20. This is particularly important if the fluid in the control valve includes erosive and/or solid particles. The bore 82 of the housing 80 provides a guide for the coupling 70 and also can resist vibrations that could affect the apparatus 10.

Additionally or alternatively, after the two members 72 and 74 of the coupling 70 have been assembled about the valve stem 20, the resilient member 30, the washer 32, and the valve member 40, the two members 72 and 74 may be joined together to form a unitary structure by various joining techniques such as, for example, welding, snap-together mechanical engagement, or applying an adhesive. Thus, the coupling 70 can maintain the connection of the valve stem 20 to the valve member 40 when the coupling 70 is located outside of the bore 82 of the housing 80, and thereby eliminate the use of the groove 29 and the snap ring 90.

Figure 3:
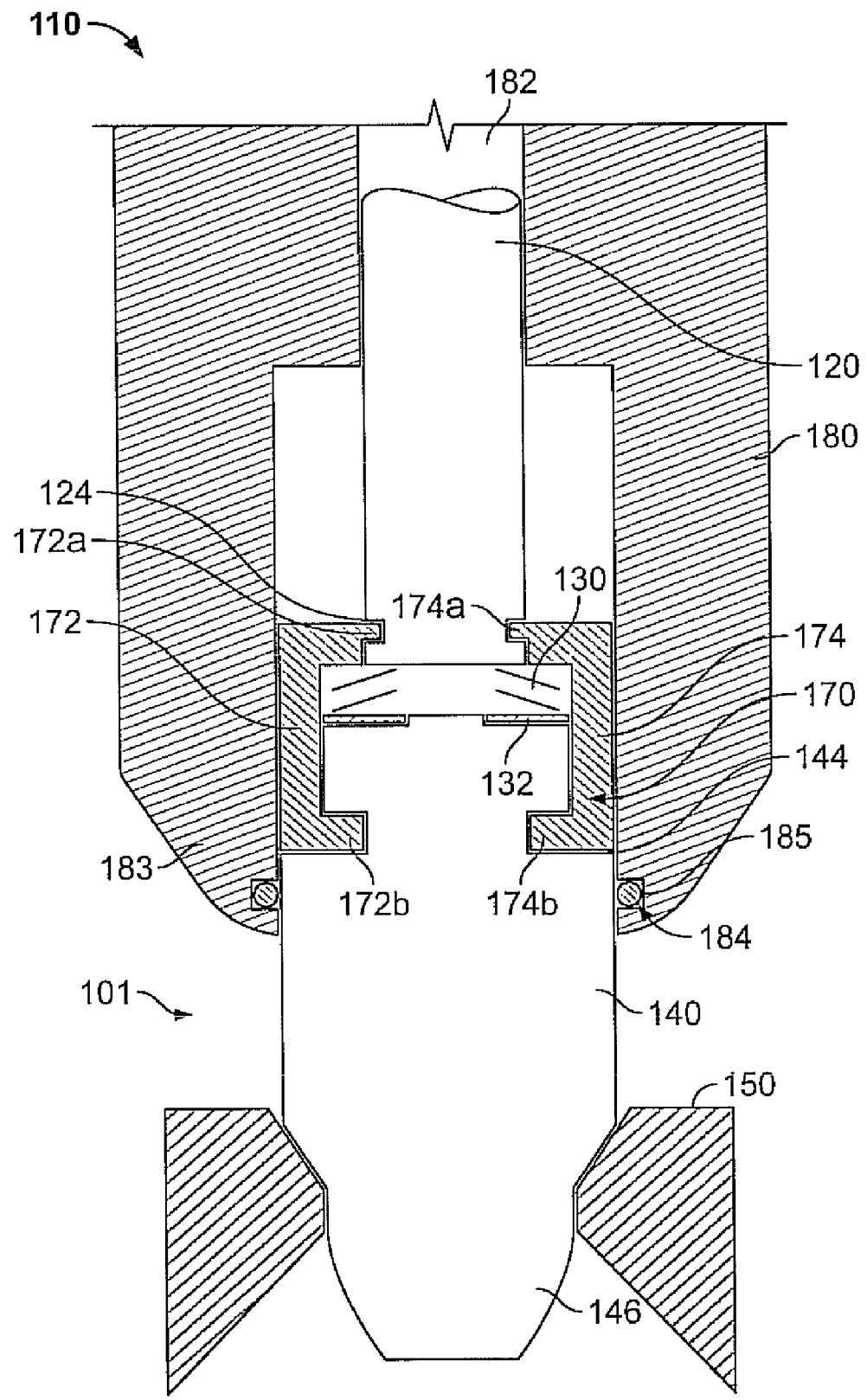
FIG. 3 is a partially cut-away schematic illustration of another example apparatus to connect a valve stem to a valve member
Figure 4:
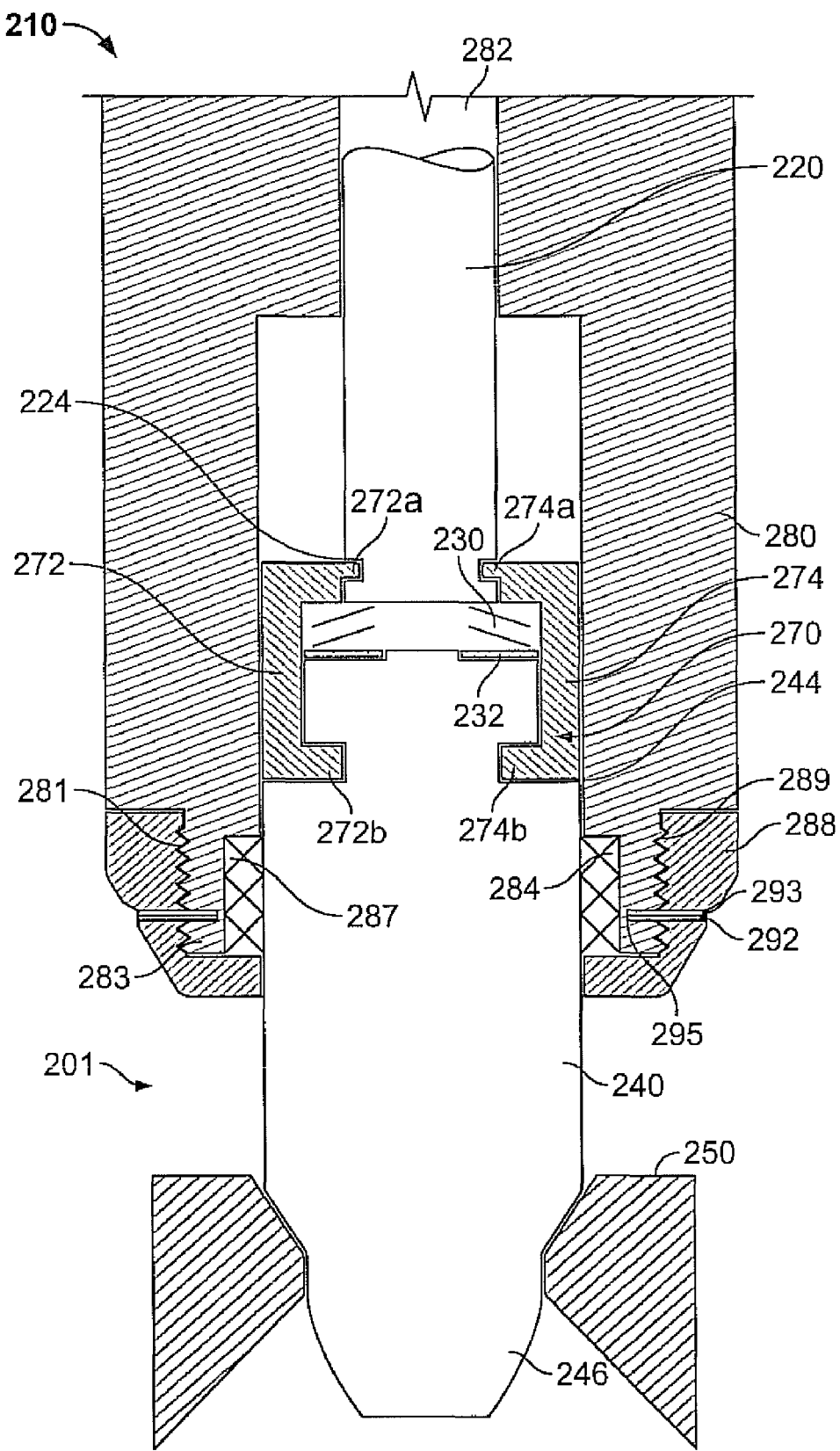
FIG. 4 is a partially cut-away schematic illustration of another example apparatus to connect a valve stem to a valve member
Figure 5:
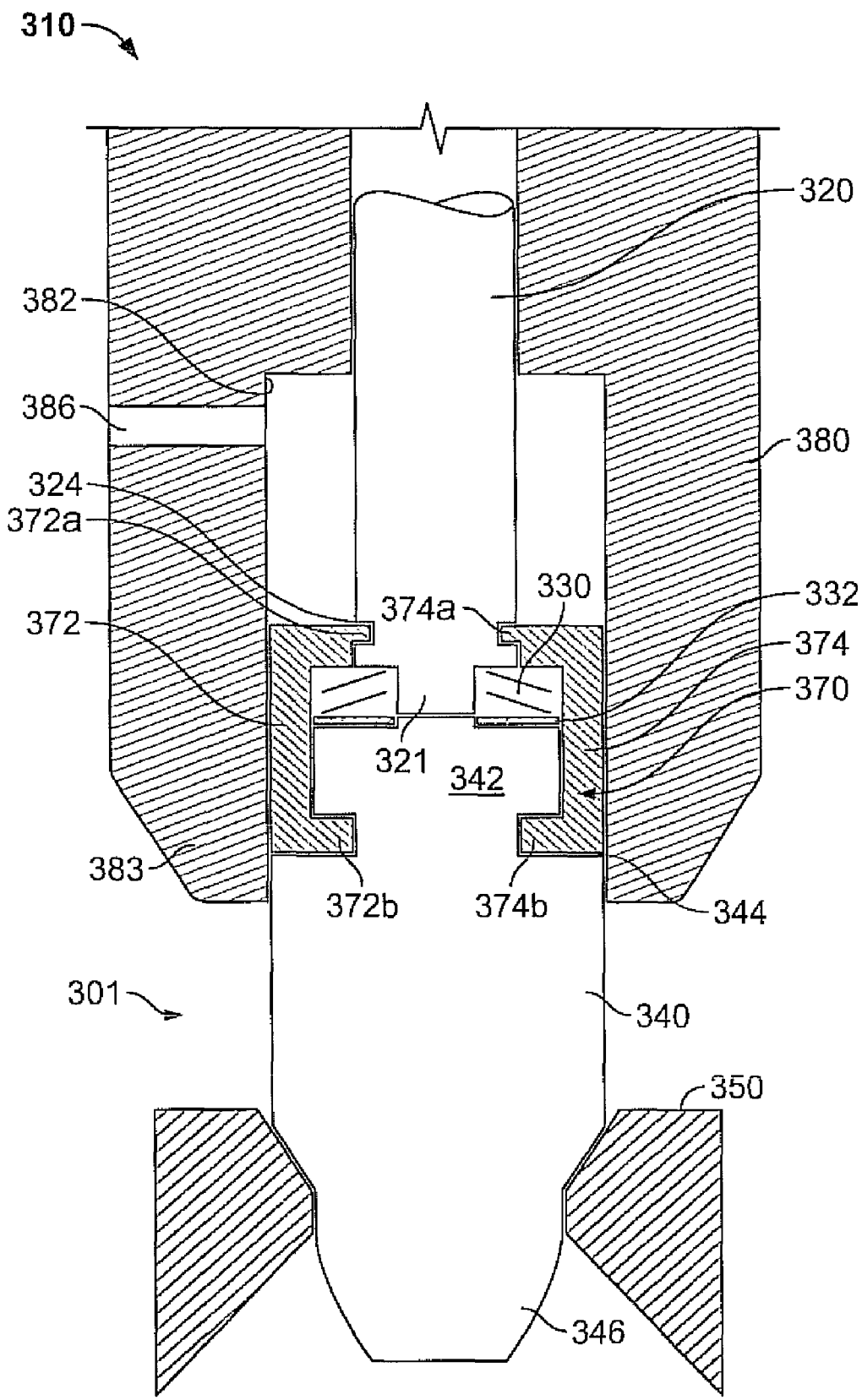
FIG. 5 is a partially cut-away schematic illustration of yet another example apparatus to connect a valve stem to a valve member.

FIGS. 3, 4 and 5 are partially cut-away schematic illustrations of further example apparatus 110, 210 and 310, respectively, to connect a valve stem to a valve member. Some elements of the example apparatus 110, 210 and 310 of the FIGS. 3, 4 and 5 are substantially the same as elements shown and described in connection with FIGS. 1 and 2. Thus, in the interest of brevity, the description of the elements that are the same as the elements in FIGS. 1 and 2 will not be repeated. Instead, the interested reader is referred back to the corresponding description of FIGS. 1 and 2. To facilitate this process, similar elements in FIGS. 3, 4 and 5 have been numbered with reference numerals increased by 100, 200, and 300, respectively, above the corresponding elements in FIGS. 1 and 2.

FIG. 3 is a partially cut-away schematic illustration of an example apparatus 110 that includes a seal or O-ring 184 received in a groove 185 of a housing 180 of the control valve 101. The O-ring 184 will provide a sliding interface seal between the housing 180 and a valve member 140 to achieve an improved fluid barrier that can prevent fluid from entering a bore 182 and affecting a valve stem 120. This is particularly important if the fluid in the control valve 101 includes erosive or solid particles.

FIG. 4 is a partially cut-away schematic illustration of an example apparatus 210 that includes a packing 284 received in an undercut 287 of a housing 280 of the control valve 201. The packing 284 is retained at a lower end 283 of the housing 280 by an attachment 288 connected by threads 289 to threads 281 of the housing 280. The attachment 288 is secured non-rotatably to the lower end 283 by locking pins 292 inserted into aligned passages 293 and 295 in the attachment 288 and the lower end 283, respectively. The packing 284 can be utilized to prevent fluid under pressure from entering a bore 282 of the housing 280.

FIG. 5 is a partially cut-away schematic illustration of yet another example apparatus 310 that includes a valve stem 320 having a valve stem abutment or longitudinal extension 321 for engagement with a valve member 340 of the control valve 301. The longitudinal extension 321 is positioned closely adjacent the valve member 340 so that during the downward movement of the valve stem 320, the resilient member 330 compresses and the extension 321 engages and directly displaces the valve member 340 into engagement with a valve seat 350. The direct engagement of the valve stem 320 with the valve member 340 may reduce vibration of the valve member 340 during engagement with the valve seat 350. Of course, the amount of separation or distance between the longitudinal extension 321 and the valve member 340 can provide a maximum compression point or limit for the resilient member 330.

Figure 6:
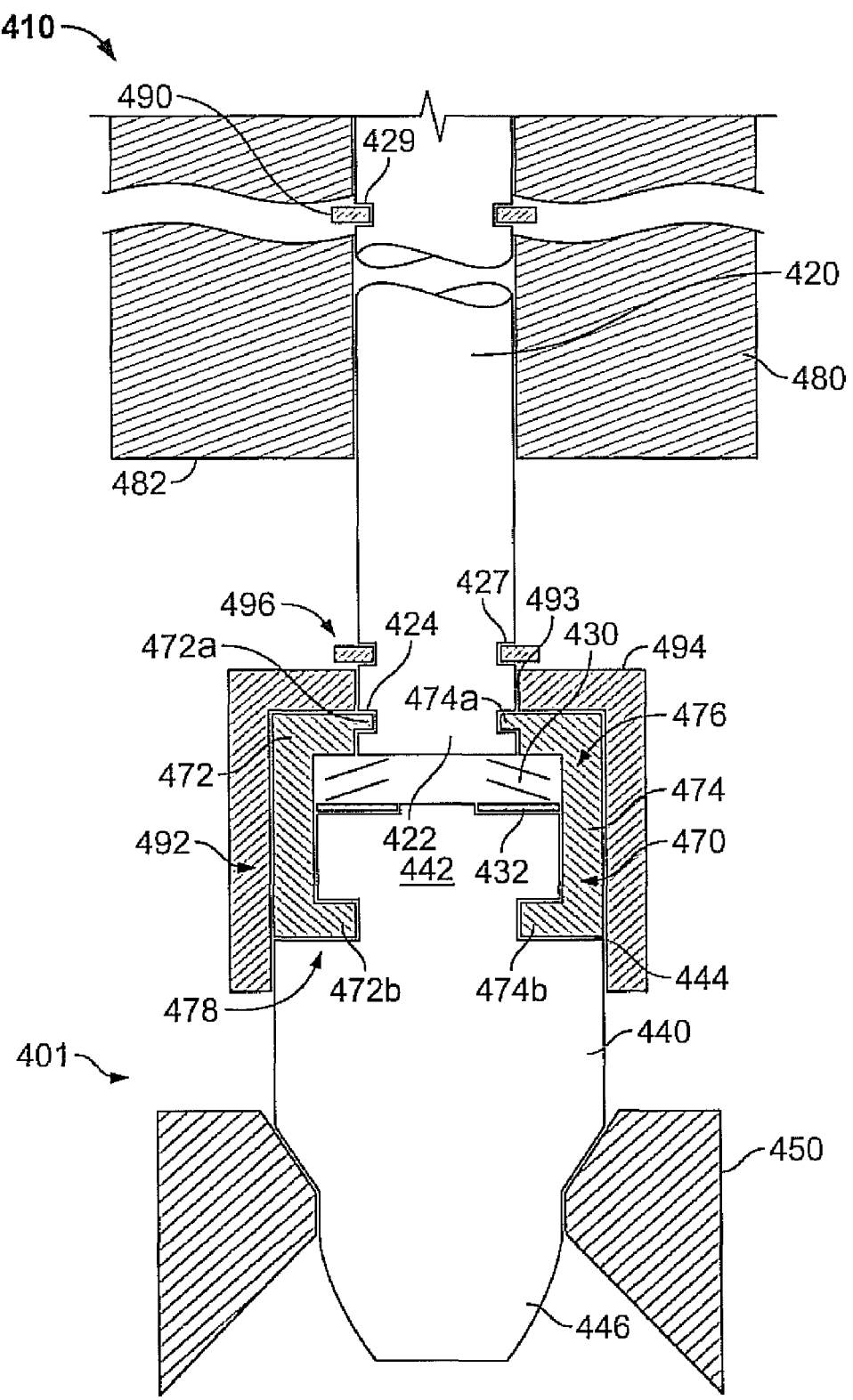
FIG. 6 is a partially cut-away schematic illustration of another example apparatus to connect a valve stem to a valve member.

FIG. 6 is a partially cut-away schematic illustration of another example apparatus 410 to connect a valve stem 420 to a valve member 440. Some elements of the example apparatus 410 of FIG. 6 are substantially the same as elements shown and described in connection with FIGS. 1-5. Thus, in the interest of brevity, the description of the elements that are the same as the elements in FIGS. 1-5 will not be repeated. Instead, the interested reader is referred back to the corresponding description of FIGS. 1-5. To facilitate this process, similar elements in FIG. 6 have been numbered with reference numerals in the 400's relative to the corresponding elements in FIGS. 1-5.

If a control valve 401 is not subject to vibrations that may affect its structure and/or operation, then a coupling 470 between a valve stem 420 and a valve member 446 may include an annular retainer 492 having a retainer opening 493 at a retainer end 494. The coupling 470 includes two portions or members 472 and 474 having opposing extensions 472a and 474a, respectively, at an end 476 of the coupling 470, and opposing extensions 472b and 474b at an opposite end 478 of the coupling 470. The housing or bonnet post 480 of the control valve 401 includes a bore 482 within which the valve stem 420, the valve member 440, and the coupling 470 are located for reciprocating movement.

To assemble the example apparatus 410 of the control valve 401, the annular retainer 492 is placed on the valve stem 420 so that an end 422 of the valve stem 420 extends through the retainer opening 493. Then the resilient member 430 and the washer 432 are placed between the end 422 and the valve member 440. The valve stem 420 and the valve member 440 are moved toward one another (i.e., the resilient member 430 is compressed), and the two members 472 and 474 of the coupling 70 are positioned about the end 422 of the valve stem 420 and the end 442 of the valve member 440 so that the extensions 472a and 474a are received in a laterally extending opening 424 of the valve stem 420 and the extensions 472b and 474b are received in a laterally extending opening 444 of the valve stem 420. The annular retainer 492 is then moved along the end 422 of the valve stem 420 so that it is disposed over the coupling 470 to retain the members 472 and 474 in engagement with the valve stem 420 and the valve member 440, and capture the resilient member 430 and the washer 432 between the valve stem 420 and the valve member 440. To ensure that the annular retainer 492 remains over the coupling 470, a snap ring 496 is received at a groove 427 in the valve stem 420. Alternatively, other retention mechanisms such as, for example, a ring, pin, clamp, adhesive, etc. may be used instead of the snap ring 496 to couple together the members 472 and 424. Thus, once the apparatus 410 is assembled, the housing 480, the valve stem 420, the resilient member 430, the washer 432, the coupling 470, and the valve member 440 may be inserted into or removed from the control valve 401 without the valve stem 420 and the control valve member 440 coming apart.

In the illustrated example apparatus 410 of FIG. 6, the resilient member 430 forces the valve stem 420 and the valve member 440 away from one another and into engagement with the coupling 470 to take-up or remove play or looseness resulting from a stack-up of dimensional tolerances of the valve stem 420, the valve member 440, and the coupling 470. However, the coupling 470 and the resilient member 430 enable the valve member 440 to move toward the valve stem 420 and compress the resilient member 430. When the valve stem 420 is moved downwardly toward the valve member 440, the example apparatus 410 transfers the downward force and movement of the valve stem 420 to the valve member 440 to engage the valve member 440 with the valve seat 450. Additionally, upward movement of the valve stem 420 moves the valve member 440 away from the valve seat 450. The transfer of the shut-off load of the valve stem 420 to the valve member 440 via the coupling 470 can achieve a distribution of the shut-off load over a larger surface area of the valve member 440. Also, the resilience or flexibility of the resilient member 430 enables the valve member 440 to self-adjust during engagement with the valve seat 450, thereby enabling the valve member 440 to align or seat for a better shut-off of fluid flow at the valve seat 450.

Although certain example apparatus are described herein, the scope of coverage of this patent is not limited thereto. On the contrary, this patent covers all apparatus and articles of manufacture fairly falling within the scope of the appended claims either literally or under the doctrine of equivalents.

What is claimed is:

1. An apparatus to connect a valve stem to a valve member, comprising:
    the valve stem having a non-threaded constant diameter along a longitudinal length thereof, and a laterally extending opening positioned along the longitudinal length;
    the valve member having a laterally extending opening;
    a coupling having adjacent one end an extension received in the laterally extending opening of the valve stem and adjacent an opposite end an extension received in the laterally extending opening of the valve member; and
    a resilient member located between the valve stem and the valve member, wherein the valve stem includes a longitudinal extension disposed beyond the longitudinal length and adjacent the valve member, the resilient member flexible to enable the longitudinal extension to move toward and engage the valve member during movement of the valve stem.

2. An apparatus as defined in claim 1, wherein the valve member is made of a non-metallic material.

3. An apparatus as defined in claim 2, wherein the valve member is made of a ceramic.

4. An apparatus as defined in claim 1, further comprising a laterally extending metal member disposed between the resilient member and the valve member.

5. An apparatus as defined in claim 4, wherein the coupling is to transmit longitudinal movement of the valve stem to the valve member.

6. An apparatus as defined in claim 1, further comprising a housing having a longitudinal bore, the resilient member and at least a portion of the valve stem and the valve member disposed in the bore.

7. An apparatus as defined in claim 6, wherein the coupling includes at least two portions located within the bore, the housing retaining the extensions in the laterally extending openings of the valve stem and the valve member.

8. An apparatus as defined in claim 6, wherein the housing includes a sealing member to engage sealingly the valve member.

9. An apparatus as defined in claim 8, wherein the sealing member comprises at least one of an O-ring or a packing.

10. An apparatus as defined in claim 9, further comprising an attachment member connected to the housing to retain the packing.

11. An apparatus as defined in claim 1, wherein the coupling comprises two portions connected together to prevent separation of the two portions from one another.

12. An apparatus as defined in claim 11, further comprising a retainer disposed about the two portions.

13. An apparatus as defined in claim 12, wherein the retainer is annular-shaped and has an opening to receive the valve stem.

14. A control valve having an apparatus to connect a valve stem to a valve member, comprising:

the valve stem having a non-threaded constant diameter along a longitudinal length thereof, and a radially extending opening positioned along the longitudinal length;

the valve member having a radially extending opening;

a coupling having adjacent one end a radial extension received in the radially extending opening of the valve stem and adjacent an opposite end a radial extension received in the radially extending opening of the valve member;

a resilient member located between the valve stem and the valve member, wherein the valve stem includes a longitudinal extension disposed beyond the longitudinal length and adjacent the valve member, the resilient member flexible to enable the longitudinal extension to move toward and engage the valve member during movement of the valve stem; and a housing having a longitudinal bore, wherein the coupling, the resilient member and at least a portion of the valve stem and the valve member are disposed in the bore.

15. A control valve as defined in claim 14, wherein the valve stem is made of metal and the valve member is made of ceramic.

16. A control valve as defined in claim 14, wherein the resilient member engages a laterally extending metal member.

17. A control valve as defined in claim 14, wherein the coupling includes at least two members located within the longitudinal bore, the housing retaining the extensions in the laterally extending openings of the valve stem and the valve member.

18. A control valve as defined in claim 14, wherein the housing includes a sealing member to engage sealingly the valve member.

19. A control valve as defined in claim 18, wherein the sealing member comprises at least one of an O-ring or a packing.

20. A control valve as defined in claim 19, further comprising an attachment member connected to the housing to position the packing to engage the valve member.

21. A control valve as defined in claim 14, wherein the coupling comprises two portions connected together.

22. A control valve as defined in claim 14, further comprising a valve seat, the valve member movable to self-align with the valve seat.

23. A control valve having an apparatus to connect a valve stem to a valve member, comprising:

the valve stem having a non-threaded constant diameter along a longitudinal length thereof, and a radially extending opening positioned along the longitudinal length;

the valve member having a radially extending opening;

a coupling having adjacent one end a radial extension received in the radially extending opening of the valve stem and adjacent an opposite end a radial extension received in the radially extending opening of the valve member;

a resilient member located between the valve stem and the valve member, wherein the valve stem includes a longitudinal extension disposed beyond the longitudinal length and adjacent the valve member, the resilient member flexible to enable the longitudinal extension to move toward and engage the valve member during movement of the valve stem; and a retainer to retain the radial extensions of the coupling in the radially extending openings.

24. A control valve as defined in claim 23, wherein the coupling comprises two portions each having radial extensions.

25. A control valve as defined in claim 24, wherein the retainer is disposed about the two portions.

26. A control valve as defined in claim 25, wherein the retainer is annular-shaped and has an opening to receive the valve stem.

27. A control valve as defined in claim 23, further comprising a valve seat, the valve member movable to self-align with the valve seat.

* * * * *